Aug. 11, 1931.    J. J. LAWLER    1,818,071
THERMOSTATIC CONTROL DEVICE FOR VALVES
Filed Oct. 20, 1928    2 Sheets-Sheet 1
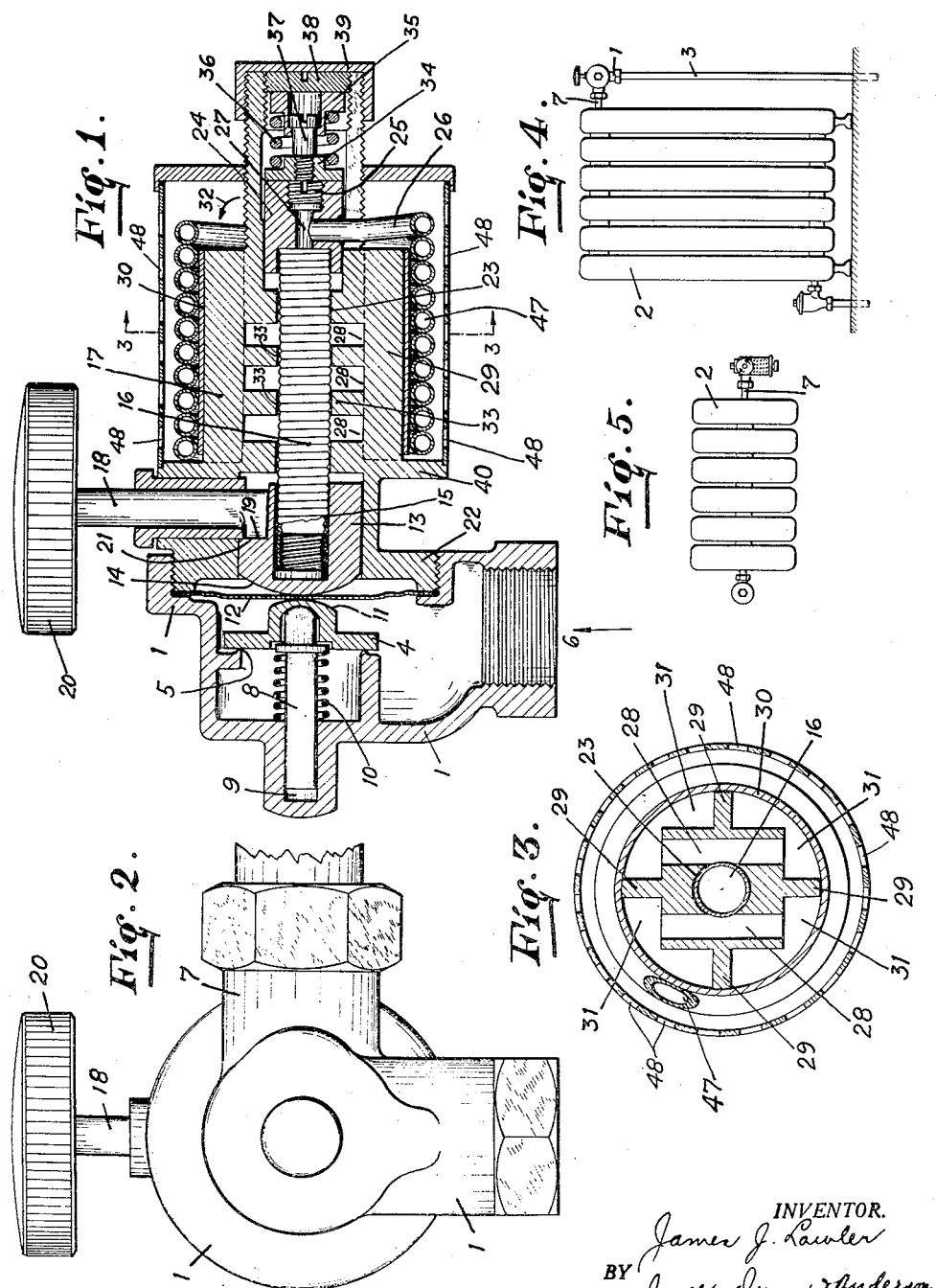
INVENTOR.
James J. Lawler
BY
Duell Dunn & Anderson
ATTORNEYS.

Aug. 11, 1931.  J. J. LAWLER  1,818,071
THERMOSTATIC CONTROL DEVICE FOR VALVES
Filed Oct. 20, 1928  2 Sheets-Sheet 2
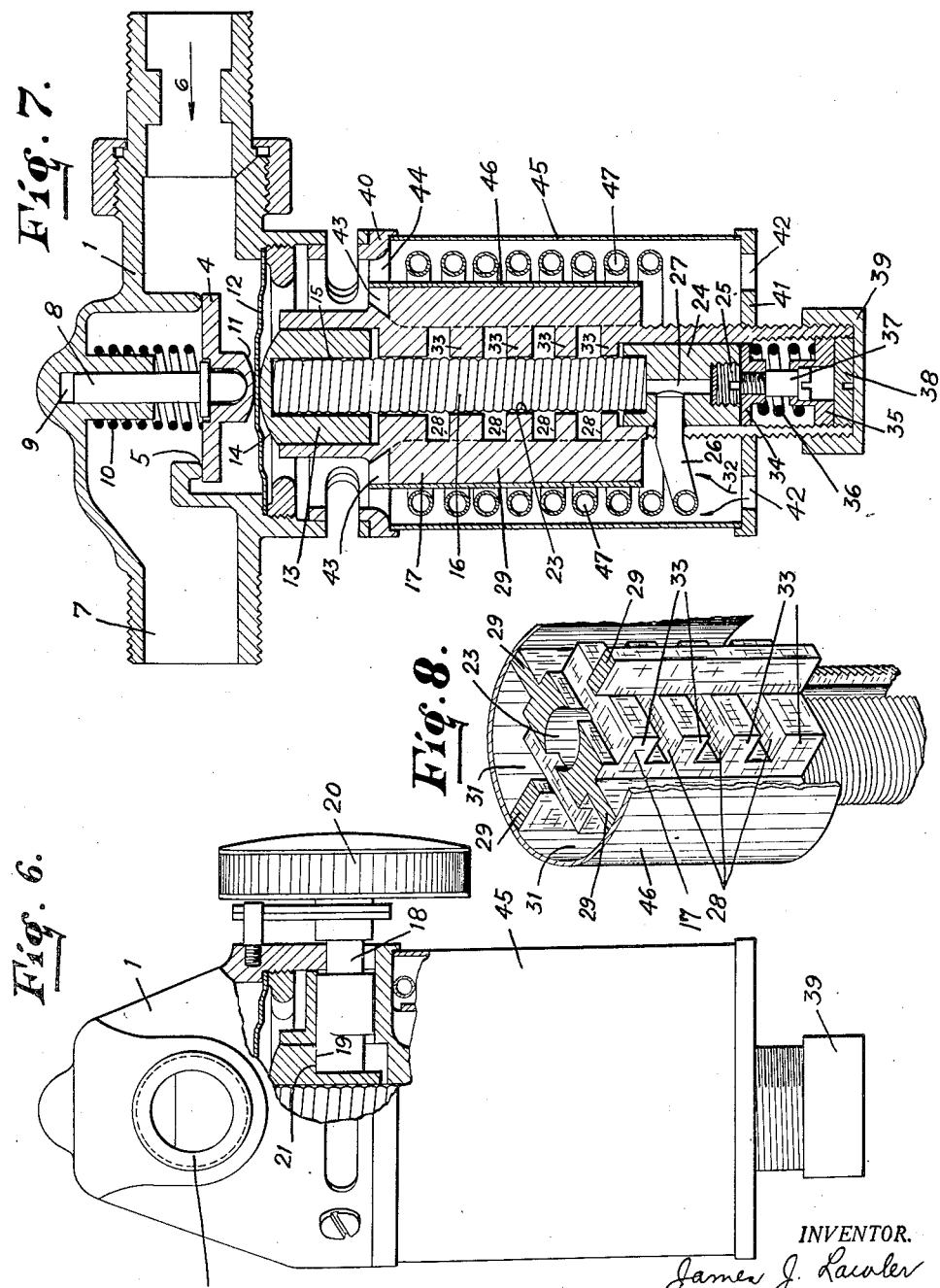
INVENTOR.
James J. Lawler
BY
Duell Dunn & Anderson
ATTORNEYS.

Patented Aug. 11, 1931

1,818,071

UNITED STATES PATENT OFFICE

JAMES J. LAWLER, OF MOUNT VERNON, NEW YORK, ASSIGNOR TO DIRECT CONTROL VALVE COMPANY, OF CHICAGO, ILLINOIS, A CORPORATION OF DELAWARE

THERMOSTATIC CONTROL DEVICE FOR VALVES

Application filed October 20, 1928. Serial No. 313,661.

This invention relates to methods and apparatus for controlling operation of valves and, with respect to its more specific features, to the automatic actuation and control of heating system valves by thermostatic devices.

Among the objects of the invention is the provision of a practical and rugged construction of a thermostatic control device; the provision of a simple and efficient construction of thermostatic device, strongly responsive to small changes in temperature; the provision of a practical construction wherewith the thermostat is placed in highly efficient, forceful condition for actuating the valve; a simple and practical method for effecting powerful and early action of the thermostat.

Other objects of the invention will in part be obvious and will in part appear hereinafter.

The invention accordingly comprises the features of construction combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Figure 1 is a vertical, longitudinal section of a valve-controlling apparatus embodying the invention;

Fig. 2 is a plan of the apparatus of Fig. 1;

Fig. 3 is a cross-section of Fig. 1;

Fig. 4 conventionally illustrates a room heater having the apparatus of Fig. 1 installed in horizontal position;

Fig. 5 is a plan of Fig. 4;

Fig. 6 is a side elevation partly broken away, of a slightly modified form of apparatus, suitable for installation in vertical position on the room radiator;

Fig. 7 is a vertical section through Fig. 6, and

Fig. 8 is a perspective sectional view of a detail.

Referring now more specifically to the drawings, the numeral 1 indicates a chamber for heating fluid as, for instance, a conduit through which the heating fluid passes to the room heater 2 from the fluid supply pipe 3. The heater 2 may be the usual large room radiator employed in heating systems. The heating fluid medium may be steam or hot water, the two-pipe installation illustrated being for steam. The conduit 1 is constructed of heat-conductive material as, for instance, metal usually employed for steam pipes in heating systems. In the conduit 1 is the valve 4 which cooperates with its seat 5 to control passage of steam to the room radiator. In the embodiment illustrated, the steam enters at 6 and flows to the room radiator through pipe 7. The valve stem 8 is guided in a socket 9 in the conduit 1, and the valve has rocking movement on the stem 8 so as to readily cooperate with the valve seat 5. A spring 10 may be employed to lift the valve 4 from its seat. One face of the valve is rounded as at 11 and contacts with a flexible diaphragm 12. This diaphragm is preferably of thin, resilient metal and is interposed between the valve 4 and a valve-actuating plunger 13. The plunger 13 has a rounded end 14 in contact with the diaphragm 12, and it also has a recess 15 for receiving one end of a thermostatic cell 16.

The plunger 13 is a metal piece reciprocally movable and guided in a heat radiator, block, or mass of heat-conductive metal, indicated generally by the numeral 17.

The numeral 18 indicates a shaft which may be rotated in opposite directions and is provided with a cam 19 for longitudinally moving the plunger 13 to effect closing of the valve 4 independently of valve actuation by the thermostatic cell 16. The shaft 18 may conveniently be operated by handle 20. The plunger 13 is provided with a cam follower as the shoulder 21.

In the present embodiment the valve-actuating and controlling thermostatic cell 16 consists of a longitudinally expansible and contractile tubular column made of corrugated, resilient metal which is filled with expansible and contractile, thermoresponsive liquid as, for instance, kerosene. As the kerosene expands on increases in temperature, it causes expansion of the corrugated tube. As the kerosene contracts on decrease in temperature, it permits the corrugated tube to contract.

The apparatus includes a mass of heat-conductive material, as heat-conductive metal, one of the purposes of which is quickly to conduct heat into close relation to the cell 16 from the stem or other fluid-heating medium employed. To this end this mass of metal, or heat radiator 17 is placed directly in heat-conductive contact with the conduit 1 so as to be quickly heated from the fluid in such conduit. In the present embodiment, the heat radiator includes an integral, relatively thick, block of metal projecting from, and which is removably attached to, the conduit 1, as by the threaded flange 22 of the block engaging a threaded recess in the metal of conduit 1. By screwing the block into said recess, the diaphragm 12 may also be securely held in place, and in this condition the diaphragm serves to seal the conduit against the escape of steam from the conduit.

In addition to quickly conducting heat to the cell 16, the heat radiator 17, in the present embodiment, is also arranged to expose the cell 16 to outside air currents. Within the radiator block 17 is a central longitudinal chamber 23 in which the cell 16 is disposed, one end of the cell lying also in the recess in the plunger 13. The opposite end of the cell 16 has a head 24 through which the cell may be filled with thermostatic liquid by removal of a sealing plug 25. Extending from the head 24 is one end of a tubular thermo-sensitive member, as the coil 26, also filled with kerosene and in communication with the cell 16, through the passageway 27, in the head 24. In the radiator block 17 are transverse openings 28 communicating with the central chamber 23, and the block also has laterally projecting wings 29. Overlying and extending around and in contact with each of the wings 29 is a metal sleeve 30 which cooperates with the block and wings to form passageways 31 through the radiator block longitudinally of the cell 16, such passageways communicating with the transverse openings 28 and with air outside the apparatus. In this wise, outside air entering the passageways 31 at one end of the block, as indicated by the arrow 32 (Fig. 1), may also pass through the openings 28 into contact with the cell 16 and thus influence the temperature of such cell. The inner walls 33 of the block 17 lie close to the cell 16 so as to be substantially in contact therewith while permitting expansion and contraction of the cell. Thus the radiator block supports and braces the cell 16 against lateral displacement from operative position.

The plunger 13 provides a movable abutment lying transversely of the chamber 23 opposite one end of the cell 16, and the recess 15 in the plunger 13 loosely engages the cell 16 so as to permit manual actuation of the plunger 13 without expansion of the cell. In effect, in the present embodiment, the plunger 13 closes one end of the central passageway in the heat radiator 17. Also in the present embodiment the central passageway 23 longitudinally extends clear through the opposite end of the radiator block 17 and said passageway contains another abutment lying transversely of the central chamber opposite the adjacent end of the cell 16. In the present embodiment this second abutment is preferably made resilient and consists of two plates 34 and 35 resiliently pressed apart by a strong spring 26, and coupled by screw 37. Outside the plate 35 is an adjusting plug 38 threaded into the radiator block. The resilient abutment is longitudinally movable in the central passageway, and the plug 38 serves to limit axial shift of this abutment away from the abutment or plunger 13. By screwing the plug 38 one way or the other, the limit of axial shift may be adjusted. The numeral 39 indicates a cap threaded on the radiator block and concealing and protecting the plug 38.

When the room heater 2 (Fig. 4) is equipped with the thermostatic controlling apparatus hereinbefore explained, the handle 20 may at any time be turned to close the steam valve 4 and cut off supply of steam to the room heater. When the conduit 1 is cold and the handle 20 is turned to permit the steam valve 4 to open under the influence of the spring 10, the steam will immediately heat the conduit 1 and, by conduction, quickly heat the radiator block 17 to a relatively high temperature as compared to that of the air in the room.

Thus relatively high temperature heat will be conducted and radiated directly to the thermostatic cell 16 and will cause the liquid in such cell to expand, and in this wise take up any air or gas spaces in the cell which may have been left by the filling operation, with the result that the cell will be in an efficient condition immediately to apply its full force for further expansion. At the same time currents of relatively low temperature air in the room will pass through the passageways 31 and transverse openings 28 into contact with the cell 16, and modify the expansive effect of the heat radiator 17 on the cell. By adjusting plug 38, the resilient abutment 34 may be so disposed that the cell 16 will act to close the valve 4 when the temperature in the room is of the predetermined temperature desired.

When the temperature in the room is lower than that desired, the cell 16 contracts and the spring 8 opens the valve for admission of steam to the radiator. Although the heat radiator 17 and the cell 16 may be at a high temperature as compared with the highest room temperature desired, nevertheless the selective valve-closing temperature may be lower than the temperature of the cell 16.

In order to augment the force of the valve operation of the cell 16 and to quicken the expansive action of the cell 16 preliminary to closure of the valve 4 thereby, the cell 16 has a tubular extension provided by the thermo-sensitive, metal tube 26, hereinbefore referred to. In the embodiment illustrated this tube 26 is in close relation to the radiator block 17 for exchange of heat therebetween, the main length of the extension 26 lying outside the radiator 17 for exposure to air currents, said main length being in the form of a coil 47 coiled around the radiator block and the sleeve 30 so as laterally to surround said block opposite the cell 16.

Enclosing and laterally spaced from the coil 47 of the extension 26 is a casing for directing air currents to the thermostatic device in an efficient direction. In the embodiment illustrated in Fig. 1, the casing is made of metal and has a number of apertures 48 distributed thereover so that rising air currents readily pass into the casing and into contact with the coil 47 and through the passageways 31 and 28 in contact with the cell 16. The coil 47 provides an additional volume of expansible and contractile liquid without increasing the length of the column 16, and the force of which augments that of the liquid in the cell. The coil also provides a large thermo-sensitive contact surface exposed to the air currents for transmitting temperature effect to the liquid in the coil. In this wise, and in conjunction with the heat radiator 17, the apparatus very quickly responds to small differences in room temperature.

In Fig. 1 the longitudinal axis of the cell and radiator block extends generally horizontally, and vertical air currents enter the side apertures 48 in the casing and thence pass to the coil and to the passageways in the radiator block. For promoting circulation in the passageways, the lefthand end of the sleeve 29 (Fig. 1) may be somewhat spaced from the flanged portion 40 of the radiator block.

When the longitudinal axis of the radiator cell is installed in a vertical position, the aperatures for circulation of air may be provided in the bottom wall 41 of the casing, as illustrated in Fig. 7, the apertures being indicated at 42. In this instance the flange 40 may also have apertures 43 registering with the passageways 31, and apertures 44 registering with the space between the lateral cylindrical wall 45 of the casing and the sleeve 46, which latter corresponds to the sleeve 30 of Fig. 1.

Thus by the above described construction are accomplished, among others, the objects hereinbefore referred to.

Having described my invention what I claim as new, and desire to secure by Letters Patent, is:

1. Valve controlling apparatus including, in combination, a valve, an expansible and contractile valve controlling cell filled with expansible and contractile thermo-responsive fluid and operatively connected with said valve, a heat conductive, radiator block in lateral proximity to said cell for radiation of heat to said cell, a heating fluid chamber of heat conductive material and communicating with said valve, said block being of massive construction and adapted to absorb and store a large quantity of heat adjacent said cell, and being in heat conductive contact with said fluid chamber.

2. Valve controlling apparatus including, in combination, an expansible and contractile valve controlling cell filled with expansible and contractile thermo-responsive fluid, a heat conductive, radiator block in lateral proximity to said cell for radiation of heat to said cell, a valve-controlling plunger, operable in response to expansion and contraction of said cell, reciprocally movable on said block, and means mounted on said block for manually moving said plunger to close the valve independently of closure thereof by said cell.

3. Valve controlling apparatus including, in combination, an expansible and contractile valve controlling cell filled with expansible and contractile thermo-responsive fluid, a heat conductive, radiator block in lateral proximity to said cell for radiation of heat to said cell, said block having radiator wings laterally projecting into close proximity to said cell.

4. Valve controlling apparatus including, in combination, an expansible and contractile valve controlling cell filled with expansible and contractile thermo-responsive fluid, a heat conductive, radiator block in lateral proximity to said cell for radiation of heat to said cell, said block having abutments mounted thereon opposite either end of said cell, one of said abutments being reciprocally movable and adapted to actuate the valve by expansion of said cell, the other abutment being resilient and shiftable axially of said cell, and means adapted adjustably to limit axial shift of said resilient abutment away from the other abutment.

5. Valve controlling apparatus including, in combination, an expansible and contractile valve controlling cell filled with expansible and contarctile thermo-responsive fluid, a heat conductive, radiator block in lateral proximity to said cell for radiation of heat to said cell, a heating fluid chamber of heat conductive material, said block being of massive construction and adapted to contain a large quantity of heat adjacent said cell, and being in heat conductive contact with said fluid chamber, a valve-controlling plunger, operable in response to expansion and contraction of said cell, reciprocally mounted on said block, and means mounted on said block for manually moving said plunger to close the valve independently of closure thereof by said cell.

6. Valve controlling apparatus including, in combination, an expansible and contractile valve controlling cell filled with expansibe and contractile thermo-responsive fluid, a heat conductive, radiator block in lateral proximity to said cell for radiation of heat to said cell, a heating fluid chamber of heat conductive material, said block being of massive construction and adapted to contain a large quantity of heat adjacent said cell, and being in heat conductive contact with said fluid chamber, said block having wings laterally projecting into close proximity to said cell.

7. Valve controlling apparatus including, in combination, an expansible and contractile valve controlling cell filed with expansible and contractile thermo-responsive fluid, a heat conductive, radiator block in lateral proximity to said cell for radiation of heat to said cell, a valve-controlling plunger, operable in response to expansion and contraction of said cell, said block having a formation providing a support reciprocally mounting said plunger, and means mounted on said block for manually moving said plunger to close the valve independently of closure thereof by said cell, said block having wings laterally projecting into close proximity to said cell.

8. Valve controlling apparatus including, in combination, an expansible and contractile valve controlling cell filled with expansible and contractile thermo-responsive fluid, a heat conductive, radiator block in lateral proximity to said cell for radiation of heat to said cell, a heating fluid chamber of heat conductive material, said block being of massive construction and adapted to contain a large quantity of heat adjacent said cell, and being in heat conductive contact with said fluid chamber, a valve-controlling plunger, operable in response to expansion and contraction of said cell, said block having a formation providing a support, reciprocally mounting said plunger, and means mounted on said block for manually moving said plunger to close the valve independently of closure thereof by said cell, said block having wings lateraly projecting into close proximity to said cell.

9. Valve controlling apparatus including, in combination, an expansible and contractile valve controlling cell filled with expansible and contractile thermo-responsive fluid, a heat conductive, radiator block in lateral proximity to said cell for radiation of heat to said cell, a heating fluid chamber of heat conductive material, said block being of massive construction and adapted to contain a large quantity of heat adjacent said cell, and being in heat conductive contact with said fluid chamber, a valve-controlling plunger, operable in response to expansion and contraction of said cell, said block having a formation providing a support reciprocally mounting said plunger, and means mounted on said block for manually moving said plunger to close the valve independently of closure thereof by said cell, said block having wings lateraly projecting into close proximity to said cell, said block having a resilient abutment mounted thereon opposite the end of said cell remote from said plunger, said abutment shiftable axially of said cell, and means adapted adjustably to limit axial shift of said abutment away from said plunger.

10. Valve controlling apparatus including, in combination, an expansible and contractile valve controlling cell filled with expansible and contractile thermo-responsive fluid, a heat conductive, radiator block in lateral proximity to said cell for radiation of heat to said cell, said block being of massive construction and adapted to contain a large quantity of heat and having an interior chamber enclosing said cell, and having air current passageways in communication with said chamber and the air outside the apparatus.

11. Valve controlling apparatus including, in combination, an expansible and contractile valve controlling cell filled with expansible and contractile thermo-responsive fluid, a heat conductive, radiator block in lateral proximity to said cell for radiation of heat to said cell, said block being of massive construction and adapted to contain a large quantity of heat, and having an interior chamber enclosing said cell, and having air current passageways in communication with said chamber and the air outside the apparatus, said block also having interior wings laterally in close proximity to said cell.

12. In a device of the character described in combination, a heat radiator having an inner, longitudinal chamber opening therethrough transverse openings communicating with said chamber, laterally projecting wings in said chamber, and a metal sleeve cooperating with said wings to form longitudinal passageways in communication with said transverse openings.

13. Valve controlling apparatus including, in combination, an expansible and contractile, valve-actuating cell filled with expansible and contractile thermo-responsive liquid, a heat-radiator of heat-conductive material, said radiator having a chamber in which said cell is disposed, a tubular thermo-sensitive member containing expansible and contractile thermo-responsive liquid in communication with said cell, said member and radiator being in close relation for exchange of heat therebetween, said radiator having abutments lying transversely in said chamber opposite either end of said cell, one of said abutments being reciprocally movable and adapted to actuate the valve by expansion of said cell, the other abutment being resilient and shiftable axially of said cell, means adapted adjustably to limit axial shift of said resilient abutment away from the other abutment, and means manually operable to move said movable abutment in its valve-actuating direction independently of valve actuation thereof by said expansion of said cell.

14. Valve controlling apparatus including, in combination, an expansible and contractile, valve-actuating cell filled with expansible and contractile thermo-responsive liquid, a heat-radiator of heat-conductive material, said radiator having a chamber in which said cell is disposed, a tubular thermo-sensitive member containing expansible and contractile thermo-responsive liquid in communication with said cell, said member and radiator being in close relation for exchange of heat therebetween, said radiator having abutments lying transversely in said chamber opposite either end of said cell, one of said abutments being reciprocally movable and adapted to actuate the valve by expansion of said cell, the other abutment being resilient and shiftable axially of said cell, means adapted adjustably to limit axial shift of said resilient abutment away from the other abutment, and means manually operable to move said movable abutment in its valve-actuating direction independently of valve actuation thereof by said expansion of said cell, the main length of said member lying outside of said radiator for exposure to air currents.

15. Valve-controlling apparatus including, in combination, an expansible and contractile cell filled with expansible and contractile thermo-responsive liquid, and a heat-conductive, metal, radiator mass having a central chamber, in which said cell is disposed, and having air-current passageways in communication with said chamber and air outside the apparatus.

16. Valve-controlling apparatus including, in combination, an expansible and contractile cell filled with expansible and contractile thermo-responsive liquid, and a heat-conductive, metal, radiator mass having a central chamber, in which said cell is disposed, and having air-current passageways in communication with said chamber and air outside the apparatus, said cell having a thermo-sensitive, liquid filled extension coiled around said mass closely adjacent to the latter.

17. Valve-controlling apparatus including, in combination, an expansible and contractile cell filled with expansible and contractile thermo-responsive liquid, a heat-conductive, metal, radiator mass having a central chamber, in which said cell is disposed, and having air-current passageways in communication with said chamber and air outside the apparatus, said cell having a thermo-sensitive, liquid filled extension coiled around said mass closely adjacent to the latter, and an apertured casing enclosing and laterally spaced from said coil.

18. Valve-controlling apparatus including, in combination, an expansible and contractile cell filled with expansible and contractile thermo-responsive liquid, a relatively thick, metal block having a longitudinal chamber containing said cell and opening in opposite ends of the block, said block having transverse openings communicating with said chamber and having laterally projecting wings, and a metal sleeve overlying said wings and therewith forming longitudinal passageways in communication with said transverse openings.

19. Valve-controlling apparatus including, in combination, an expansible and contractile cell filled with expansible and contractile thermo-responsive liquid, a relatively thick, metal block having a longitudinal chamber containing said cell and opening in opposite ends of the block, said block having transverse openings communicating with said chamber and having laterally projecting wings, a metal sleeve overlying said wings and therewith forming longitudinal passageways in communication with said transverse openings, a valve-actuating metal plunger guided in said passageway and, having a recess to receive one end of said cell, and a longitudinally adjustable, resilient abutment opposite the other end of said cell.

20. Valve-controlling apparatus including, in combination, an expansible and contractile cell filled with expansible and contractile thermo-responsive liquid, a relatively thick, metal block having a longitudinal chamber containing said cell and opening in opposite ends of the block, said block having transverse openings communicating with said chamber and having laterally projecting wings, and a metal sleeve overlying said wings and therewith forming longitudinal passageways in communication with said transverse openings, said cell having a thermo-sensitive, liquid filled extension coiled around said sleeve.

21. Valve-controlling apparatus including, in combination, a metal conduit for containing fluid heating medium, a valve in said conduit, a relatively thick, metal block removably mounted on said conduit and projecting therefrom, a valve-actuating plunger reciprocal in said block, a flexible, diaphragm between said valve and plunger, a central longitudinal chamber in said block, said block having air-current passageways in communication with said chamber and the outer air, a thermo-responsive expansible and contractible cell in said chamber filled with expansible and contractile liquid and adapted to actuate said plunger, and a thermo-responsive coil communicating with said cell and filled with expansible and contractile liquid, said coil laterally surrounding said block opposite said cell, a valve-actuating cam supported by said block and adapted for manually moving said plunger relative to said cell.

In testimony whereof I affix my signature.

JAMES J. LAWLER.